United States Patent
Krulitsch et al.

(10) Patent No.: US 8,931,621 B2
(45) Date of Patent: Jan. 13, 2015

(54) CONTAINER HANDLING MACHINE HAVING MOVABLE TRANSPORT STARS

(75) Inventors: Dieter-Rudolf Krulitsch, Bad Kreuznach (DE); Michael Beisel, Schoneberg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/984,890

(22) PCT Filed: Jan. 26, 2012

(86) PCT No.: PCT/EP2012/000333
§ 371 (c)(1),
(2), (4) Date: Aug. 12, 2013

(87) PCT Pub. No.: WO2012/107172
PCT Pub. Date: Aug. 16, 2012

(65) Prior Publication Data
US 2013/0313081 A1    Nov. 28, 2013

(30) Foreign Application Priority Data

Feb. 10, 2011  (DE) .......................... 10 2011 010 954
Feb. 10, 2011  (DE) .......................... 10 2011 010 955

(51) Int. Cl.
| | |
|---|---|
| *B65G 47/84* | (2006.01) |
| *B67C 3/24* | (2006.01) |
| *B65G 47/86* | (2006.01) |
| *B67C 3/22* | (2006.01) |
| *B67C 7/00* | (2006.01) |
| *B65G 47/90* | (2006.01) |

(52) U.S. Cl.
CPC .............. *B67C 3/242* (2013.01); *B65G 47/847* (2013.01); *B67C 3/22* (2013.01); *B67C 7/0046* (2013.01); *B65G 47/846* (2013.01); *B65G 47/908* (2013.01)
USPC .................................... 198/473.1; 198/478.1

(58) Field of Classification Search
CPC ........................... B65G 47/847; B65G 47/848
USPC .......................... 198/473.1, 478.1, 441, 459.2
See application file for complete search history.

(56) References Cited

U.S. PATENT DOCUMENTS

| | | | |
|---|---|---|---|
| 5,540,320 A * | 7/1996 | Sarto et al. ................. | 198/473.1 |
| 8,668,074 B2 * | 3/2014 | Davidson .................. | 198/478.1 |
| 2010/0133067 A1 * | 6/2010 | Martinelli .................. | 198/470.1 |
| 2011/0072761 A1 * | 3/2011 | Clusserath et al. .......... | 53/266.1 |

FOREIGN PATENT DOCUMENTS

| | | |
|---|---|---|
| DE | 20 2007 017932 | 10/2008 |
| DE | 10 2008 023 776 | 11/2009 |
| WO | WO 2010/013263 | 2/2010 |

\* cited by examiner

*Primary Examiner* — Leslie A Nicholson, III
*Assistant Examiner* — Keith R Campbell
(74) *Attorney, Agent, or Firm* — Occhiuti & Rohlicek LLP

(57) ABSTRACT

A container handling machine includes transport stars and a container transfer station between adjacent stars. The container transfer station has a drive element arranged between two adjacent stars for moving them relative to each other in a way that results in centers of the adjacent stars being moved relative to each other according to an ascertainable and operationally-induced deviation during operation of the container handling machine.

15 Claims, 4 Drawing Sheets

CONTAINER HANDLING MACHINE HAVING MOVABLE TRANSPORT STARS

CROSS REFRENCE TO RELATED APPLICATION

Figure 1:
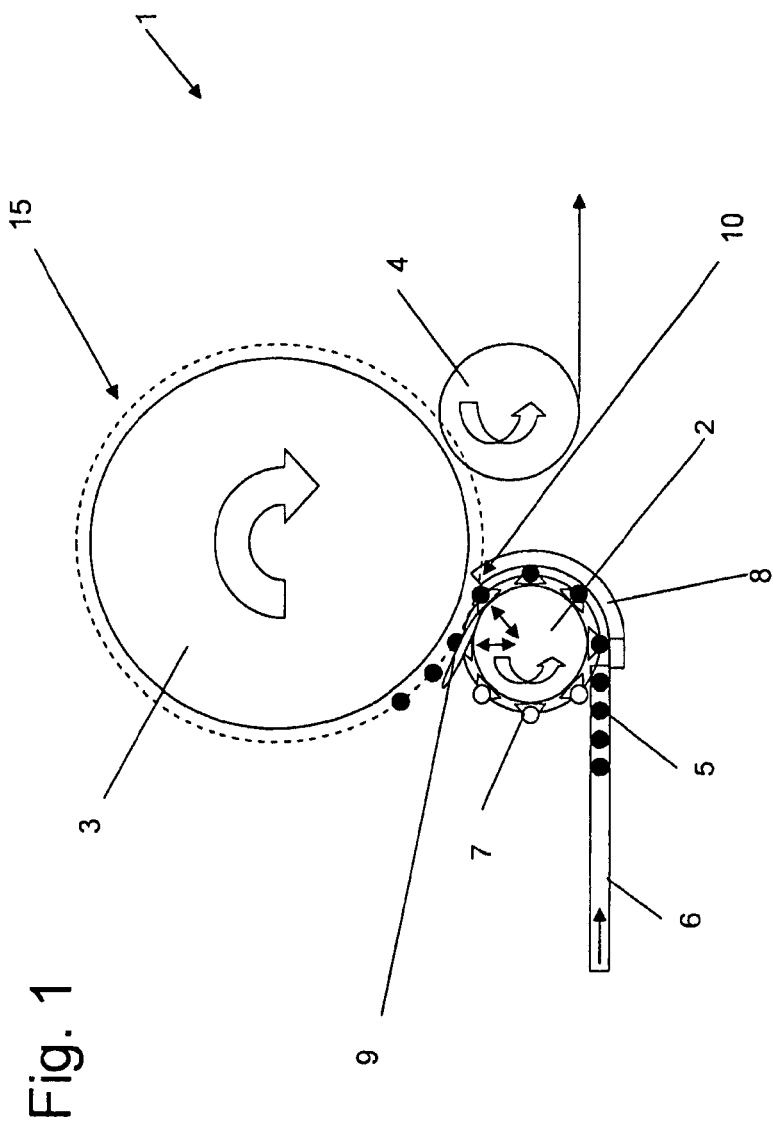

This application is the national phase under 35 USC 371 of international application no. PCT/EP 2012/000333, filed Jan. 26, 2012, which claims the benefit of the priority date of German application no. 10 2011 010 955.2, filed Feb. 10, 2011 and German application no. 10 2011 010 954.4, filed Feb. 10, 2011. The contents of the aforementioned applications are incorporated herein in their entirety.

FIELD OF DISCLOSURE

The invention concerns a container-handling machine for bottles or similar containers, having transport stars and at least one primary star, on which a plurality of handling stations are disposed, wherein the various stars have a plurality of holding and/or gripping positions, each for one container, wherein at least one container transfer station is provided between adjacent stars and/or handling machines.

BACKGROUND

Handling machines of this kind are known in various embodiments, in particular also as filling machines, labelling machines, inspection machines and as rinsers. The supply and removal of bottles or similar containers occurs inter alia by means of stars. The aforesaid containers can be used for example as bottles for liquids, for example for drinks. The containers, for example bottles, can be made of a transparent or translucent material, for example of glass or a translucent plastic, e.g. PET. It is also feasible for the containers to be made of other materials and filled with other contents.

Before the operational start, the container transfer station or the particular bottle transfer point from the one star to the other star must be set in terms of division and/or partial arc and/or height. The disadvantage here is in particular that setting procedures of this kind represent a production interruption and changes which arise during the operation of the machine, in particular in the event of heat expansion and/or a bottle format part change, are not taken into account. In particular, the heat expansion for large filler carousels (e.g. "hot and cold fillers measuring more than 3 m in diameter") leads to the pitch circle diameter changing by a few millimetres (e.g. cold filling at 6° C. and hot filling at 90° C.). But normal "operationally induced" heating of the carousel also changes the transfer situation and requires a regular setting and re-setting of the bottle transfers which must be adapted for the operating point/temperature.

DE 10 2008 023 776 A1 discloses a handling machine for bottles or similar containers with a rotor or rotating primary star on which a plurality of handling stations are arranged. To form the bearing of the primary star with adequate stability and at reduced costs, DE 10 2008 023 776 A1 proposes that the bearing of the rotor be formed by means of a plurality of rollers arranged and distributed around the machine axis, forming the bearing arrangement. DE 10 2008 023 776 A1 discloses making, on the circumference, the bearing of the rollers outside a fixed partial area in a movable manner so that, in the event of changes in the rotor diameter due to heat expansion, e.g. with hot-filling of products and also in the event of the cleaning and/or sterilisation of the handling machine, compensation is possible. The compensation occurs by radial offset of the machine axis, i.e. the primary star. DE 10 2008 023 776 A1 further proposes that the fixed rollers be disposed on the tangent points between rotor and transport star so that these tangent points do not shift in the event of heat expansion of the rotor.

SUMMARY

The purpose of the invention is to show a container handling machine with which production interruptions due to operationally induced changes are reduced.

Advantageous in accordance with the invention is when at least one drive element is provided between two adjacent stars and/or handling machines, by means of which the two immediately adjacent stars can be moved relative to each other, wherein the centres of the two adjacent stars can be moved relative to each other according to an ascertainable operationally induced deviation during the operation of the container handling machine.

With the embodiment of the container handling machine according to the invention, it is possible to react immediately to changing operational parameters, without the fear of setting-induced or adaptation-induced production losses due to interruptions in the container flow or the halting of the stars. Since the drive element allows a constant adaptation to changes, in particular to thermally induced changes to the container handling machine or its components in their position to each other during operation, without interrupting it. In particular thermally induced diameter changes can be compensated by the invention during operation. It is expedient here that despite the relative movement of the components to each other, the transfer point of the individual stars to each other, i.e. the tangent point remains positionally stable, which also advantageously effects a reduction in container damage.

To be able to compensate for changes, in particular thermally induced changes of the stars, during operation, it is expediently proposed that measuring elements be provided, which for example can be in the form of a temperature sensor and/or travel measuring system. A temperature sensor for example can be disposed directly on the primary star to record the current temperature, from which a diameter change arises in accordance with physical laws. Naturally, a temperature sensor can also be disposed on each other star. The temperature sensor is here advantageously disposed on a top face and/or underside of the star. In addition or alone, the travel measuring system can be provided which expediently is disposed at a distance from the edge of the star in order to record its thermally induced circumference change over the changing travel distance. In addition, the measuring elements can also be in the form of distance sensors which record the distances of adjacent stars and/or container handling machines, or partial areas of them. In this way, the container transfer can be directly controlled.

It is expedient for the measuring elements to be connected to the corresponding star device, or to route the measured value to the control device. This can occur by wire or wirelessly, whereby the particular transmission types are generally known. From the measured values, the control device establishes the resulting or existing diameter change or operationally induced change to the container transfer and generates from this appropriate control signals for the drive element, so that a relative movement of the stars in relation to each other can be effected via the drive element, to compensate for the diameter change or operationally induced change to the container transfer. The control device thus has an analysis function, wherein the measured values supplied are converted into corresponding diameter changes or changes to the container transfer, from which the control signals to activate the drive element are generated and supplied to the drive element. The control signals can naturally likewise be transmitted by wire or wirelessly.

In this regard, it is expedient if the drive element is controlled depending on the operating temperature of the container handling machine or its stars, as the temperature acts directly on a diameter change or on the change to the container transfer. It is thus advantageous if the heat expansion is recorded, and/or if the temperature is recorded from which the heat expansion is calculated. Naturally, the temperature of the medium, for example the cleaning medium, can also be recorded, from which the diameter change or the thermally induced change to the transfer can then be determined.

To make the two stars moveable relative to each other, it is expediently planned for the drive element to be disposed on a guide, said guide being arranged between the two stars. For example, the guide could be arranged between the primary star or the primary carousel and the adjacent transport star and both connected so that they are movable relative to each other. A linear guide is feasible here, which engages in a rack beneath the star level. The drive element can compensate the operationally induced changes by means of the linear guide so formed, by shifting the two stars relative to each other.

The linear guide can, for example, also be disposed under the ring mount of the primary star or the carousel. The linear guide can however also engage on the feet of the rack or on the rack underneath the stars. In theory, the linear guide can be motor-driven. In this case, the drive element can be an electric motor, or a hydraulically or pneumatically operated motor with a control signal receiver unit.

In a possible embodiment, the turning of the stars can be proposed. It is possible for example to rotate the one star centrically around the centre of the other star to compensate for the changes.

In a further possible embodiment, the relative movement can be generated by means of a thermally acting drive element. The drive element here is advantageously a connecting bridge between the two stars which is heated in order to compensate for the changes.

In a further possible embodiment, it can be planned for the drive element only to track the primary star, and/or only to track the particular transport star, and/or to track all components together, coordinated with each other.

In a preferred embodiment, it is advantageously planned that the warmer star in terms of temperature or the warmer container handling machine in terms of temperature relative to the colder components or machines in terms of temperature is tracked in a relatively moveable manner. For example, the compensation for the heat expansion in the event of a filling machine (for hot-filling) can take place by a tangential shift of the stars to the cold stars. However, also feasible is the swivelling of the stars around the centre points of the cold stars, to compensate also for any radial spacing error.

It is however favourable also if in addition to compensating thermally induced changes by means of the drive element, bottle grippers or take-up elements are also made to be flexible so that these bottle grippers or take-up elements could also compensate the thermally induced change. In this way, one or more radially oriented springs acting on the bottle grippers or take-up elements can effect a radial shift. In addition, a spring acting perpendicular to it which effects a compensation of the radial spacing error can be provided. Spring elements are here preferably made so that they preferably yield, i.e. are pressed together, under heat expansion. Naturally, the bottle grippers can also be made so that they themselves are flexibly yielding, wherein external spring elements could be omitted. The bottle gripper itself could then be quasi in the form of a spring element with a gripping function.

With the invention, the container handling machine adapting to thermally induced changes in particular with regard to the transfer station is achieved, wherein a production interruption can be avoided. It is also favourable that at the same time a simple adaptation to different container formats is also possible. To do this, the drive elements can adapt the container transfers in the event of a container format change where the latter receive a corresponding control signal. The control signal can here be generated by the control device, which receives the relevant input signals manually or automatically.

BRIEF DISCRIPTION OF THE FIGURES

Figure 2:
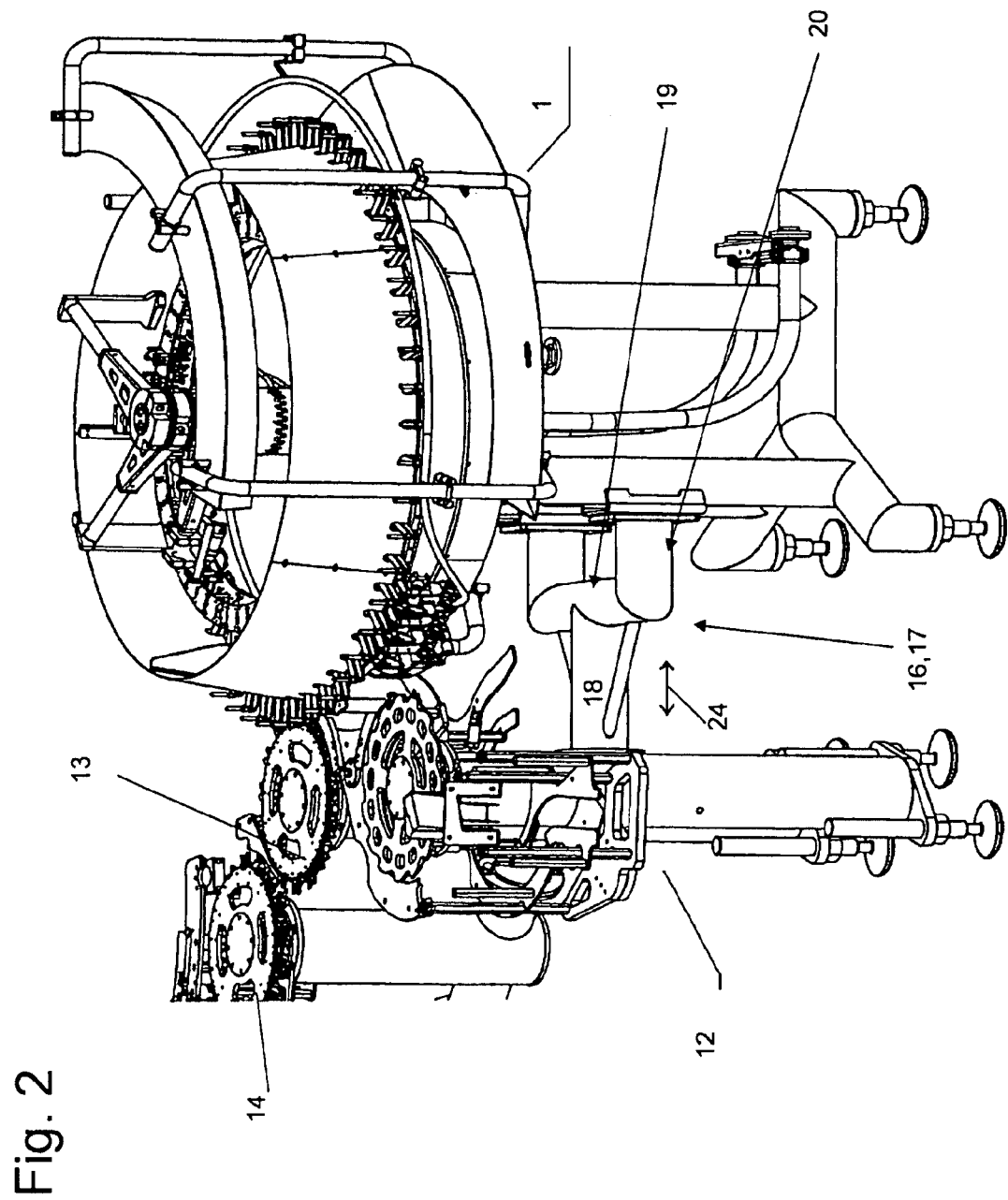
Figure 3:
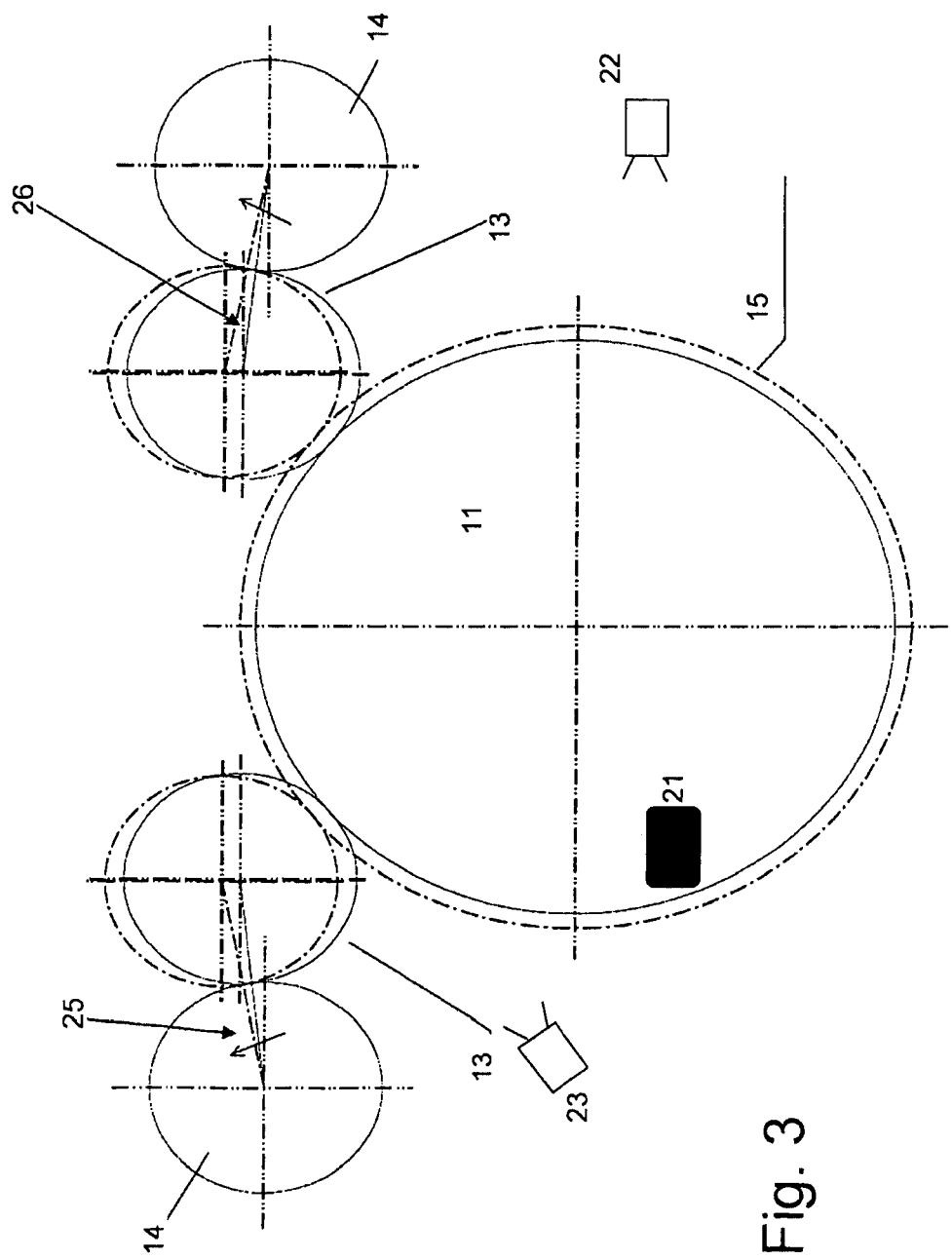
Figure 4:
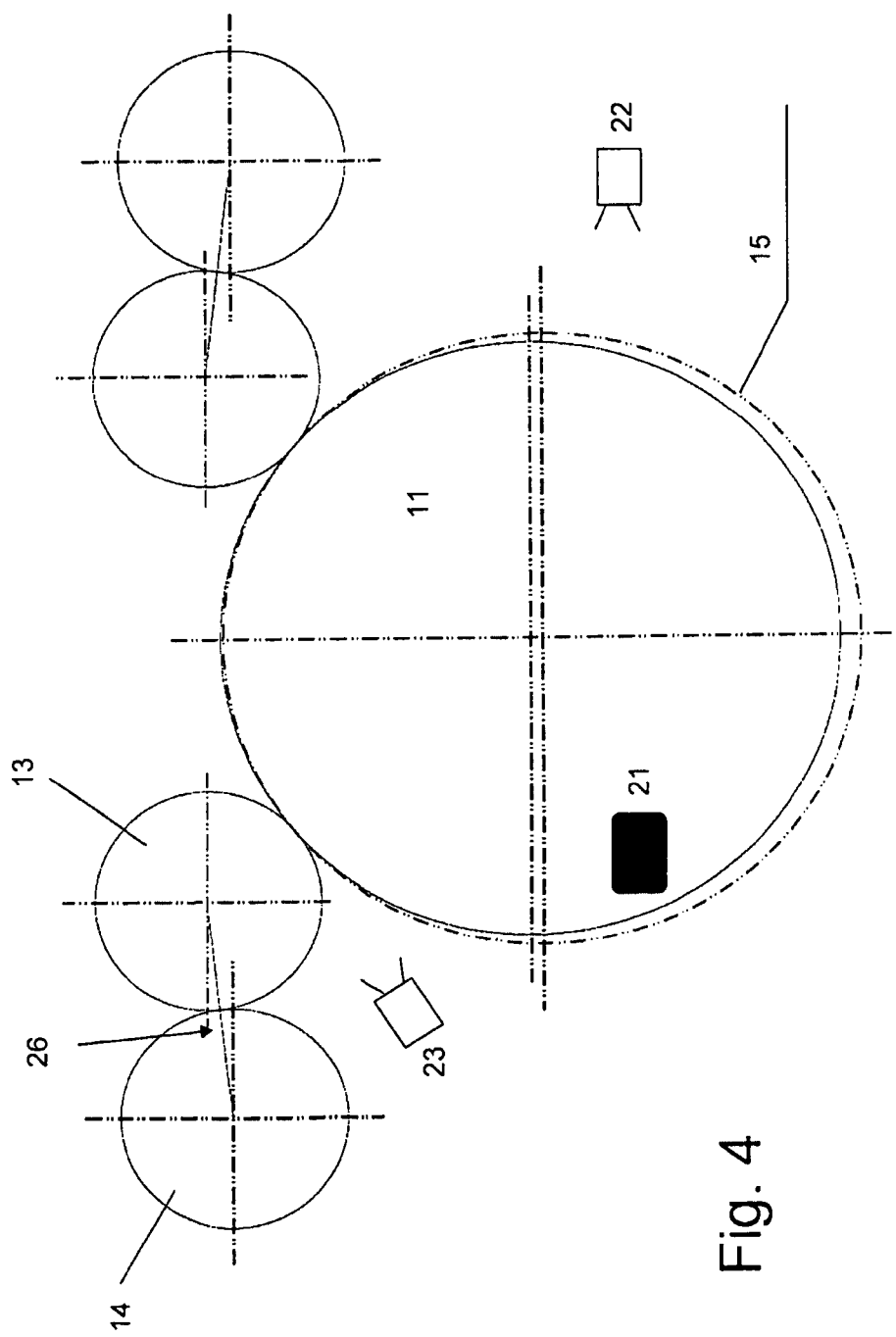

Further advantageous embodiments of the invention are disclosed in the subsidiary claims and the following illustrations. The following are shown:

FIG. 1 A container handling machine by way of example as a filling machine,

FIG. 2 A container handling machine by way of example as a rinser,

FIG. 3 A container handling machine showing the principle, in which transport stars can be turned relative to the primary carousel and FIG. 4 A container handling machine showing the principle, in which the primary carousel can be moved relative to the transport stars.

In the various figures, the same parts are always given the same reference symbols, and hence they are generally also only described once.

FIG. 1 shows a container handling machine 1, which by way of example is made as a filling machine or filler. This is generally known.

The container handling machine 1 has transport stars 2, 3 and 4, i.e. a feed star 2, a primary star 3 and a discharge star 4. Containers 5 are supplied to the feed star 2 on a conveyor 6. The containers 5 are transported from the feed star 2 to the primary star 3 or filler carousel 3 and by the latter to the discharge star 4. Filling stations are disposed on the filler carousel 3.

For example, the feed star 2 can be described as the push star 2, which has a plurality of holding devices 7 to hold the containers 5, such as PET bottles for example. It can be seen in FIG. 1, by means of the solid circles (which are to represent the containers 5) that the containers 5 are transported to the primary star 3 by means of the holding devices 7. Unoccupied holding devices 7 are represented by blank circles in FIG. 1. The holding devices 7 are shown in a simplified form in FIG. 1. By way of example, the feed star 2 is enclosed around part of its circumference by a supporting bend 8, on which the containers 5 can slide by their neck ring. Moreover, fixed transfer elements 9 are still preferably provided.

The transfer elements 9 are disposed in the area of the container transfers 10, at which the containers 5 are passed from the feed star 2 to the primary star 3.

The transfer from the primary star 3 to the discharge star 4 can be carried out in a similar way whereby the discharge star can be made similarly to feed star 2.

FIG. 2 in contrast shows a container handling machine 1, which by way of example is made as a rinser. The rinser has a primary star 11 or the primary carousel 11, and by way of example a feed star 12 and transport stars 13, 14.

The container handling machines 1 can be subject to operationally induced changes, in particular thermal changes, wherein a thermally induced diameter change can result, which is represented in FIGS. 1, 3 and 4 by means of the dashed line 15.

This diameter change can be compensated with the invention by providing at least one drive element which is disposed between two adjacent stars and/or handling machines, by means of which the two immediately adjacent stars can be moved relative to each other, wherein each of the centres X of the two adjacent stars can be moved relative to each other according to an ascertainable operationally induced deviation during the operation of the container handling machine.

By way of example, a mechanically acting drive element 16 is represented in the embodiment as a linear guide 17. The linear guide 17 is forked with a main strip 18 and an adjacent U-shaped profile with a base web 19 and two U-shaped webs 20.

The U-shaped webs 20 are each connected at their ends to the rack of the rinser, whereby the base web 19 is fixed on the main strip, said main strip 18 in the example of an embodiment illustrated in FIG. 2 being connected to the rack of the feed star 12.

By means of measuring elements which can be seen in an arrangement in principle in FIGS. 3 and 4, and can be in the form of a temperature sensor 21 and/or a travel measuring sensor 22 and/or a distance sensor 23, now for example the temperature of the primary star 11 can be recorded. The sensors 22 and 23 are simply represented by way of example with a camera symbol. Optical monitoring is preferred although this is not intended to be restrictive. Naturally, sensors 21, 22 and/or 23 can be provided on all stars or transfers, wherein in each case one sensor 21, 22 and 23 is shown in FIGS. 3 and 4.

To this end, the temperature sensor 21 is in a measuring connection with the primary star 11. The measured values are fed to a control device which is not illustrated, which calculates a corresponding diameter from the temperature, wherein a corresponding control signal is generated by the control device and supplied to the drive element 16, which in this way adapts the transfer 10 to the operationally induced change of diameter. A shift is indicated in FIG. 2 by the double arrow 24.

Naturally, drive elements can also be disposed on the other stars.

In FIGS. 3 and 4, the container handling machine 1 is likewise only made as a rinser by way of example, wherein only the transport stars 13, 14 and the primary carousel 16 are represented.

In the example of an embodiment shown in FIG. 3, an operationally induced diameter compensation is achieved by means of the drive element, by turning the transport stars 13. Here, the transport star 13 is turned around the centre of the transport star 14, which can be seen by means of the arrow 25 and the shifted connecting line 26 of both centres X of the transport stars 13 and 14.

With the one in FIG. 4 on the other hand, the primary carousel 11 is moved to achieve a compensation for the diameter change.

Naturally, both the primary star and also the transport and feed stars can be turned in coordination with each other. A combination of linear guide and/or pivoting compensation is also favourable. In this way, one drive element can be allocated to each star, which is connected to the control device, and receives corresponding control signals. Reference symbol list:

REFERENCE SYMBOL LIST

1 Container handling machine
2 Transport star/feed star
3 Primary star
4 Transport star/discharge star
5 Containers
6 Conveyor
7 Holding device
8 Supporting bend
9 Transfer elements
10 Container transfer
11 Primary star
12 Feed star
13 Transport star
14 Transport star
15 Thermally induced diameter change
16 Drive element
17 Linear guide
18 Main strip
19 Base web
20 U-shaped web
21 Temperature sensor
22 Travel measuring sensor
23 Distance sensor
24 Double arrow
25 Arrow
26 Connecting line

The invention claimed is:

1. An apparatus comprising a container-handling machine, said container-handling machine comprising transport stars, a container-transfer station, and a drive element, wherein one of said stars is a primary star on which handling stations are arranged, wherein each of said stars comprises holding positions, wherein each holding position grips a container, wherein said container-transfer station is between adjacent stars, wherein said drive element is arranged between two adjacent stars for moving said two adjacent stars relative to each other, and wherein centers of said adjacent stars are moved relative to each other according to an ascertainable operationally-induced deviation during operation of said container-handling machine.

2. The apparatus of claim 1, further comprising a measuring element for ascertaining said operationally-induced deviation.

3. The apparatus of claim 2, wherein said measuring element comprises a temperature sensor.

4. The apparatus of claim 2, wherein said measuring element comprises a travel-measurement sensor.

5. The apparatus of claim 2, wherein said measuring element comprises a distance sensor.

6. The apparatus of claim 2, wherein said measurement element is connected to a top face of at least one of said stars.

7. The apparatus of claim 2, wherein said measurement element is connected to an underside of at least one of said stars.

8. The apparatus of claim 1, further comprising a control device for adjusting said drive element.

9. The apparatus of claim 1, further comprising a control device, and measurement elements for detecting said operationally induced changes, wherein said measuring elements are connected to said control device, and wherein said control device generates, from measured values provided by said measuring elements, control signals for controlling said drive element.

10. The apparatus claim 1, further comprising a guide between adjacent stars, wherein said drive element is disposed on said guide.

11. The apparatus of claim 1, wherein said drive element comprises a linear guide that engages underneath a level of a star.

12. The apparatus of claim 1, wherein a star comprises a rack, and wherein said drive element engages said rack.

13. The apparatus claim 1, wherein said drive element comprises an electric motor.

14. The apparatus claim 1, wherein said drive element comprises a control signal receiving unit.

15. The apparatus claim 1, wherein said drive element is controlled based at least in part on an operating temperature.

* * * * *